United States Patent Office 2,943,475
Patented July 5, 1960

2,943,475

PROCESS FOR VISIBLY DETECTING REACTOR INSULATION FAILURE BY MEANS OF COLOR CHANGE IN TEMPERATURE INDICATING PAINT APPLIED TO EXTERIOR WALL THEREOF

Jacques Benveniste, Union, and Charles P. West, Metuchen, N.J., and Harvey N. Lieberman, Bronx, N.Y., assignors to Esso Research and Engineering Company, a corporation of Delaware No Drawing. Filed May 23, 1957, Ser. No. 661,010

6 Claims. (Cl. 73—15)

This invention relates to the use of certain novel paint compositions which will indicate a rise in temperature above certain defined ranges. More specifically the novel paint composition of this invention will change color in a definitive manner when subjected to temperatures of over 500° to 600° F. for any sustained prior of time.

In many industries and especially in the refining of petroleum, reaction vessels of one sort or the other are subjected to intense heats, usually in the presence of chemically reactive gaseous materials and especially hydrogen, often under high pressures. As an example, catalytic cracking reactors are operated internally at about 900° F. and at elevated pressures. The catalyst regenerator for the catalytic cracker is operated at a temperature several hundred degrees higher than the reactor and the auxiliary equipment such as transfer lines, pipes, etc. are similarly at high temperatures. Due to the presence of hydrogen in the catalytic cracking system ordinary structural carbon steel is prone to extreme rapid corrosion and failure at temperatures in excess of about 550° to 600° F. It has been suggested to employ certain alloys for the manufacture of such equipment; however, the special alloys required to withstand these high temperatures and the corrosive action of hydrogen or other gases, are extremely expensive. Investment in such temperature resistant equipment would add considerably to the cost of the product and is usually economically prohibitive.

As a practical matter refinery equipment of this nature is made of ordinary structural carbon steel with some type of insulated lining protecting the steel from the high temperatures noted above. While various types of insulating material have been suggested most commonly firebrick is used. In some cases a coating of the special allow is employed in the interior of the equipment as an extra safety precaution.

Since the structural carbon steel corrodes very rapidly at temperatures in excess of 550° F. in the presence of hydrogen or other reactive gases extreme care must be exercised to avoid maintaining the reactor walls at this high temperature for any extended period of time. The petroleum industry has been in dire need of a simple and effective warning device which would immediately call the attention of operating crews to dangerously high temperatures usually resulting from a failure of the insulation.

It has now been discovered that certain pigments in combination with certain carriers may be employed in a paint which when applied to a reactor or other surface will act as a temperature indicating device. The particular combination of this invention provides a paint which will change within a period of one hour in a clear definitive manner from blue or green to white at temperatures in the range of 510° to 630° F. It is essential that this paint change color and act as a warning within a relatively short time since hot spots in reactors of the type noted above can be extremely hazardous. It is also essential that the paint change from one color to a color in a different family. For example, the change from yellow to orange to red or from blue to green would possibly go unnoticed whereas a definitive change such as indicated herein, i.e. blue to white, would be obvious and quickly alert the operating crews.

The pigments of this invention comprise copper phthalo cyanine and monochlorinated copper phthalo cyanine. Surprisingly these pigments per se in the absence of the resins to be defined hereinafter will not change color within the temperature range noted above. The copper phthalo cyanine which is a blue pigment in combination with the resin changes sharply from a royal blue to white at a temperature of about 530° to 570° F. The monochlorinated copper phthalo cyanine which is a green reacts in the same manner as the copper phthalo cyanine changing sharply to white but at slightly higher temperatures, e.g. about 590° to 630° F. Both pigments in combination with the resins when applied as paints may be subjected to elevated temperatures below 475° to 510° F. for extended periods of time without changing color. The copper phthalo cyanine at elevated temperatures just below 475° F. will after a while fade slightly; however it will retain its distinctly blue color tone.

As noted previously the pigments of this invention will not change color at the indicated temperatures in the absence of specific resin carriers. The resin carriers which have been found to be operable are the silicone-alkyd resins which may have a silicone to alkyd ratio of from 5 to .5:1, and silicone resins per se. The silicone resins are represented by the following general formula:

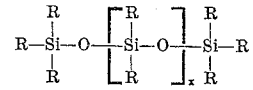

where R may represent substituted or unsubstituted alkyl, aryl, haloaryl, alkylaryl, arylalkyl and cycloalkyl radicals. In commercial practice, however, the methyl and phenyl radicals are most generally employed for the purpose of preparing paint resins and the polymer is generally highly cross-linked. Specific silicone resins are methyl-phenyl and dimethyl silicones. The molecular weight may vary considerably but of course must be sufficiently high to render the product resinous. These silicone resins are well known in the paint art and are available under trade names such as Dow-Corning R–805, G.E. SR–82 and SR–112. The alkyd resins which are employed in the paint industry are prepared from the interaction of acids with alcohols. Generally polycarboxylic and polyhydroxy alcohols are employed. Typical alkyd resins are made from sebacic acid, maleic acid, maleic anhydride, succinic acid, terephthalic acid, with ethylene glycol, diethylene glycol, glycerol and other polyhydroxy alcohols. The glyptals are made from phthalic anhydride and glycerol. Various combinations of silicone and silicone-alkyd resins may be employed with the pigments of this invention. The proportions of pigment to resin are not believed critical; however sufficient pigment should be present to effect the desired bright royal blue color or bright green color depending on the pigment. Suitable ratios of pigment to resin are from 15 to 40 parts by weight of pigment to 80 to 130 parts by weight resin. The solvent employed in the present paints may be any conventional paint solvent such as high flash naphtha or the like and in an amount sufficient to render the paint easily brushable. Beside the copper phthalo cyanine pigment there may be employed pigment extenders such as talc, titanium dioxide and the like. Also conventional driers such as cobalt octoate, calcium octoate and the like, as well as antioxidants, or antiskinning agents, e.g. hydroquinone, may be employed as in conventional paints.

It is also necessary that the present paint be heat resistant and that it resist peeling and flaking at higher temperatures. Thus other common carriers such as fish oil in combination with the copper phthalo cyanine pigment are not suitable due to an unexplainable interaction between the two components causing poor heat resistance which is manifested by peeling and flaking at higher temperatures.

*Example 1*

To illustrate the effectiveness of the instant paint compositions a paint comprising the following formulation—33.8 lbs. silicone-alkyd resin, comprising a methyl-phenyl silicone resin having a viscosity at 25° in 50% xylene solution of 80 to 125 centipoises, in combination with a glycerol-terephthalic acid ester alkyd resin in a weight ratio of silicone to alkyd of 25 to 75; 31 lbs. of $TiO_2$; 2 gals. of copper phthalo cyanine blue; 31 lbs. of naptha solvent; 0.09 lb. cobalt octoate; 0.18 lb. manganese octoate; 0.14 lb. calcium octoate—was prepared. This paint was applied to an iron pipe approximately 4 inches in diameter and 4 feet in height. The pipe was then heated at one end, thereby graduating the temperature from the bottom of the pipe at well over 1000° F. to a minimum temperature at the top of the pipe of below 300° F. In one hour at the 575° F. level a definitive clean cut change from royal blue to white in a straight line separation took place. Very slight fading occurred at temperatures of 405° to 545° F. No change occurred below 405° F. The film was integral from the separation line to the lowest temperature level and slightly chalky in the white portion; however, adhesion along the entire length of the pipe was excellent.

*Example 2*

A prior art temperature indicating red pigment with a carrier was tested as in the previous example with the following results: This prior art temperature indicating paint changed from red to orange through three color changes, brick-red (400° F.), brown (445° F.), black (475° F.) to gray (565° F.) to whitish (635° F.).

It is readily seen that a temperature indicating paint which changes throughout a multiplicity of color hues as well as not showing the hot spot in a clear definitive line can be confusing and lead to misinterpretations of the various color changes.

What is claimed is:

1. A process for visibly detecting insulation failure on the exterior wall of an interiorly insulated high temperature carbon steel reactor, said reactor being insulated interiorly to maintain the temperature during operation of said exterior wall below about 510° F., which process comprises applying a colored coating to the exterior wall of said reactor, said coating consisting essentially of 15 to 40 parts by weight of a pigment selected from the group consisting of copper phthalo cyanine and monochlorinated copper phthalo cyanine and 80 to 130 parts by weight of a carrier comprising a silicone-alkyd resin, the ratio of silicone to alkyd resin being from 5 to 0.5:1.0; subjecting the interior of said reactor to temperatures in excess of about 510° F.; and reducing said interior reactor temperature promptly after any portion of said colored coating changes to a white color and thereby indicates failure of said interior insulation.

2. A process according to claim 1 wherein said pigment is copper phthalo cyanine.

3. A process according to claim 1 wherein said pigment is monochlorinated copper phthalo cyanine and the interior of said reactor is subjected to temperatures in excess of about 590° F.

4. A process for visibly detecting insulation failure on the coated exterior wall of an internally insulated high temperature carbon steel reactor, wherein said reactor is internally insulated to maintain the temperature during operation of said exterior wall below about 510° F. and said exterior wall coating comprises a colored coating composition consisting essentially of 15 to 40 parts by weight of a pigment selected from the group consisting of copper phthalo cyanine and monochlorinated copper phthalo cyanine and 80 to 130 parts by weight of a carrier comprising a silicone-alkyd resin, the ratio of silicone to alkyd resin being from 5 to 0.5:1.0; which process comprises subjecting the interior of said reactor to temperatures in excess of about 510° F. such that a sharp color change takes place in said colored coating composition within a period of about one hour upon failure of said interior insulation.

5. A process according to claim 4 wherein said pigment is copper phthalo cyanine, and wherein said interior reactor temperature is promptly reduced after detecting that any portion of said colored coating has changed to a white color.

6. A process according to claim 4 wherein said pigment is monochlorinated copper phthalo cyanine and the interior of said reactor is subjected to temperatures in excess of about 590° F.

References Cited in the file of this patent

UNITED STATES PATENTS 2,768,149    Millar _____ Oct. 23, 1956

OTHER REFERENCES

Von Fischer et al.: "Organic Protective Coatings," Reinhold Publishing Corp., New York, New York, 1953, pages 361–362.

Cook et al.: "Silicones in Protective Coatings," Official Digest, October 1951, pages 629–632.